(No Model.)

J. M. SMITH.
BRAKE FOR RAILWAY CARS.

No. 534,245. Patented Feb. 12, 1895.

Witnesses
Charles Hannigan
Joseph J. Scholfield

Inventor
James M. Smith
By S. Scholfield
Atty.

THE NORRIS PETERS CO., PHOTO-LITHO., WASHINGTON, D. C.

UNITED STATES PATENT OFFICE.

JAMES M. SMITH, OF VALLEY FALLS, RHODE ISLAND, ASSIGNOR TO HIMSELF AND ANDREW J. CURRIER, OF SAME PLACE.

BRAKE FOR RAILWAY-CARS.

SPECIFICATION forming part of Letters Patent No. 534,245, dated February 12, 1895.

Application filed April 17, 1894. Serial No. 507,872. (No model.)

*To all whom it may concern:*

Be it known that I, JAMES M. SMITH, a citizen of the United States, residing at Valley Falls, in the county of Providence and State of Rhode Island, have invented a new and useful Improvement in Brake Mechanism for Street-Cars, of which the following is a specification.

The object of my invention is to check the momentum of the car with greater ease and rapidity than by means of the brake mechanism in common use, and my invention consists in the combination with the ordinary brake shoes, of a friction clutch for utilizing the momentum of the car to force the brake shoes against the rim of the wheels, as hereinafter fully set forth.

Figure 1:
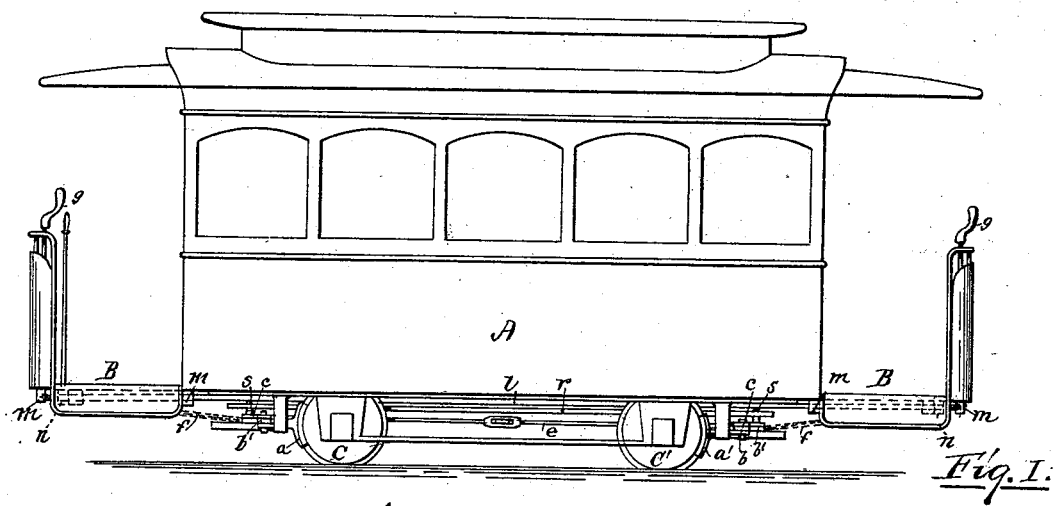
Figure 2:
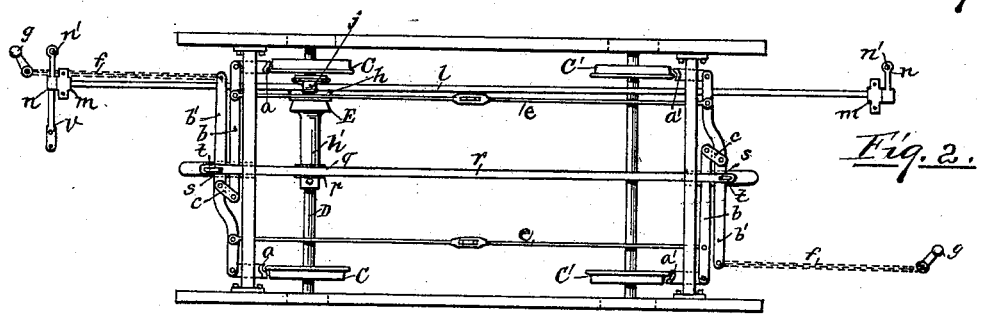
Figures 3, 4, 5:
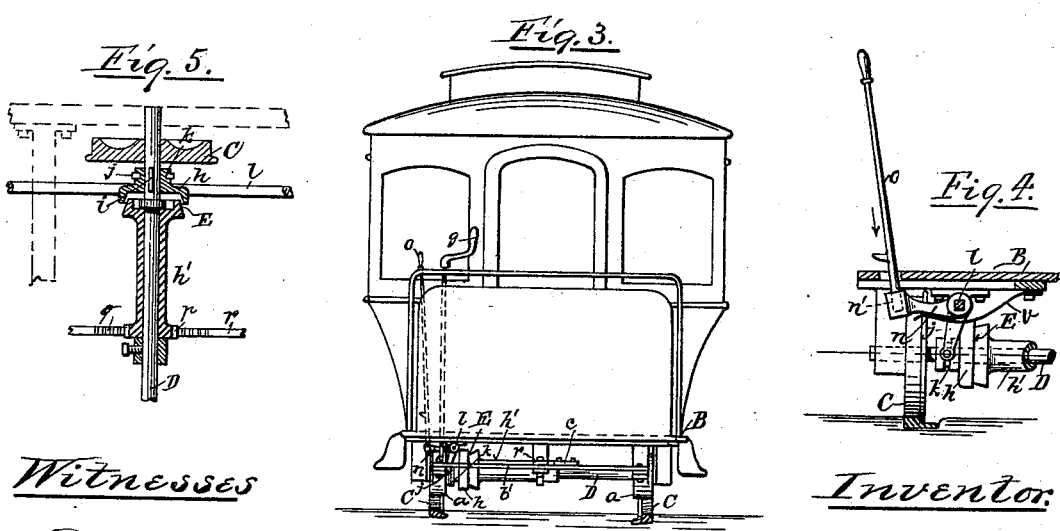

In the accompanying drawings, Figure 1, represents a side elevation of a street car provided with my improvement. Fig. 2, represents a top view of the truck of the car with the body removed, showing the brake mechanism. Fig. 3, represents an end elevation. Fig. 4, represents a detail section showing the friction clutch for actuating the brakes. Fig. 5, represents an enlarged detail view of the friction clutch.

In the drawings, A represents the body of the car; B, B, the platforms, and C, C, C', C', the car wheels.

The brake mechanism consists of the brake shoes $a$, $a$, $a'$, $a'$, which are jointed to the levers $b$, $b$, $b'$, $b'$, the said levers $b$ and $b'$, being connected with each other by means of the links $c$, $c$, and the levers $b$, $b$, and $b'$, $b'$, connected to each other by means of the rods $e$, $e$, so that when the end of either one of the levers $b'$, $b'$, is moved outward by winding up the chain $f$, by means of the handle $g$, the brake shoes $a$, $a$, $a'$, $a'$, will be pressed against the wheels C, C, C', C', to check the motion of the car; but the movement of the handle $g$ by the motor man requires a considerable effort to apply the brakes, so as to suddenly check the momentum of the car in case of emergency, and to provide for stopping the car in a run of shorter distance, I place upon one of the axles D, a friction clutch E, formed with the sliding clutch sleeve $h$, which is held to rotate with the axle D by means of the spline $i$, the said clutch sleeve $h$ being operated for engagement with the clutch sleeve $h'$ and disengagement therefrom, by means of the fork $j$ held in the annular groove $k$, the said fork being secured to the square rod $l$, which extends lengthwise of the car, and is supported in suitable bearings $m$, and at the outer ends of the rod $l$, are secured the outwardly extending arms $n$, $n$, which are provided with a socket opening $n'$, adapted to receive the end of the removable hand lever $o$, by means of which the proper movement may be imparted to the clutch sleeve $h$, for engagement or disengagement, the arms $n$ $n$ being held in their upward position by means of suitable springs $v$.

The clutch sleeve $h'$ is loose upon the axle D, and is provided with gear teeth $p$ which engage with the teeth of the rack $q$ on the sliding bar $r$, the said bar being connected to the levers $b'$, $b'$, by means of the bolts $s$, $s$, which are loosely held in the slots $t$, $t$, at the ends of the bar $r$, so that when the car is running in either direction, the movement of the bar $r$ will serve to apply the brake to the wheels of the car.

I claim as my invention—

In a brake mechanism for street cars, the combination with the brake-shoes, and suitable lever-means for operating the same to contact with the wheels, of the friction clutch upon the axle, means connecting with the platform for effecting the engagement and disengagement of the friction clutch, and the slotted bar which serves to connect the loose member of the friction clutch with the lever-means for operating the brake shoes, whereby the brakes will be operated when the car is going in either direction, substantially as described.

JAMES M. SMITH.

Witnesses:
 SOCRATES SCHOLFIELD,
 HARRY J. GARCEAU.